UNITED STATES PATENT OFFICE.

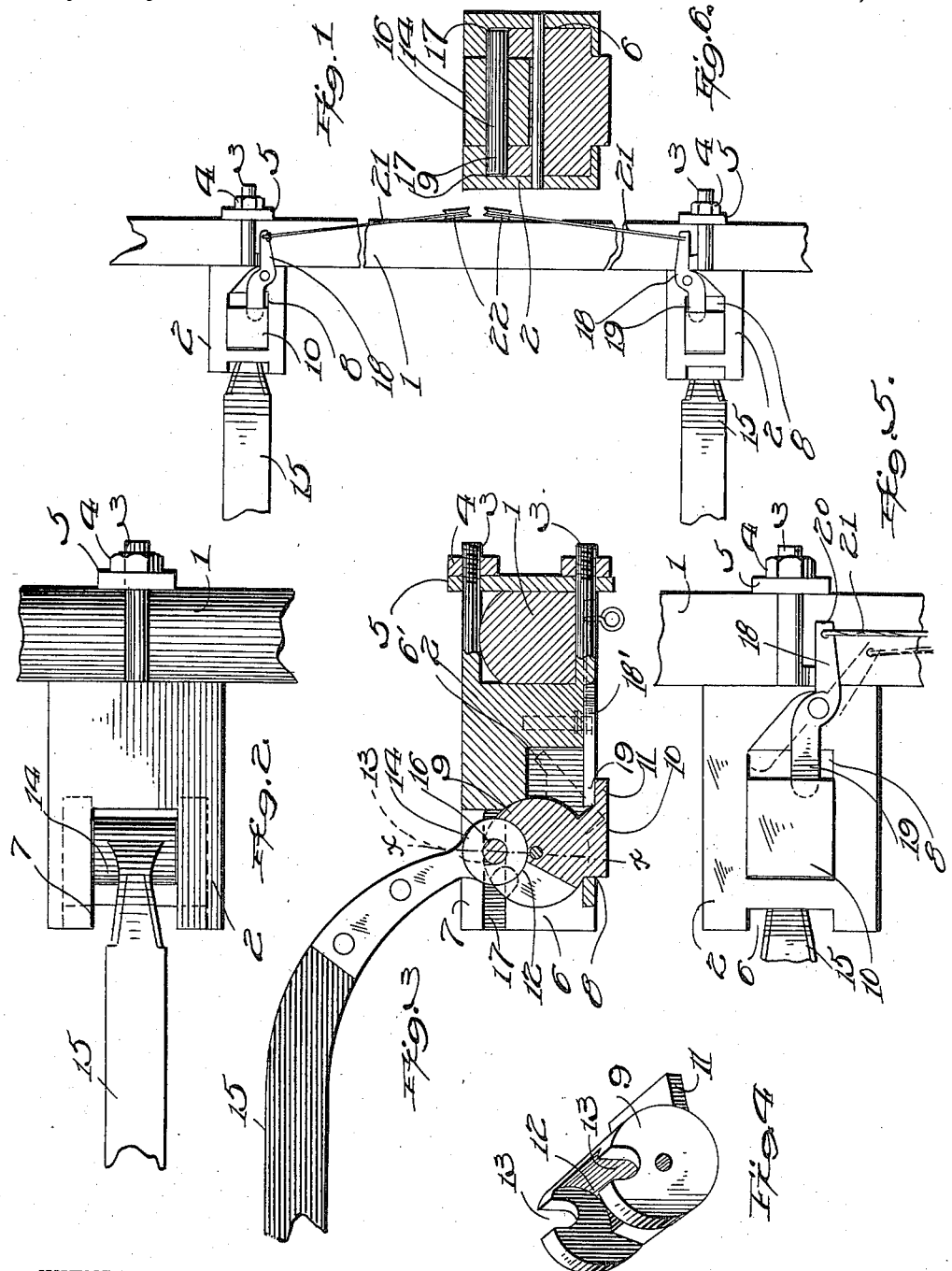

JULIUS GEORGE FRANCIS, OF NEW IBERIA, LOUISIANA.

HORSE-RELEASER.

1,030,071.

Specification of Letters Patent. Patented June 18, 1912.

Application filed September 12, 1911. Serial No. 648,930.

*To all whom it may concern:*

Be it known that I, JULIUS G. FRANCIS, a citizen of the United States, residing at New Iberia, parish of Iberia, State of Louisiana, have invented certain new and useful Improvements in Horse-Releasers, of which the following is a specification, reference being had therein to the accompanying drawing.

This invention relates to shaft attachments for vehicles and has special reference to shaft attachments for vehicles so constructed and arranged that the shafts may be readily detached from the vehicle by the driver in case the horse runs away so that the runaway horse will be readily released from the vehicle.

The invention has for its object to provide a simple and effective device for releasing the shafts of a vehicle in case the horse runs away.

Referring to the accompanying drawings: Figure 1 is a plan view of a portion of an axle and a pair of shafts, and a device constructed in accordance with this invention for detaching the shafts from the axle. Fig. 2 is an enlarged detail plan view of a portion of an axle and a shaft and a device connecting the shaft to the axle for releasing the shafts, constructed in accordance with this invention. Fig. 3 is an enlarged detail view in longitudinal section of the device shown in Fig. 2. Fig. 4 is a detail view of a portion of the device shown in Fig. 3. Fig. 5 is a plan view of the invention looking at the device on the opposite side from that shown in Fig. 2. Fig 6 is a detail view in cross section on the line X—X, Fig. 3.

In carrying out the invention a pair of members for connecting the shafts of a vehicle to the axle are provided, each of said members being connected to the axle 1 and each being formed of a block 2 secured to the axle in any suitable manner, and, as here shown, by means of the bolts 3 straddling the axle 1 and secured in place by a nut 4 at the end of each bolt, and a plate 5 mounted on the bolts 3 located between the nuts 4 and the axle 1. The block 2 is formed with a chamber 6 open at its forward end and having an open top 7 and an opening 8 in its bottom. Pivotally mounted in the chamber 6 is a cylindrical member 9 having a portion 10 depending from its bottom projecting through the opening 8 in the block 2, said projection 10 being formed with a rearwardly extending lip 11. The cylindrical member is also formed with a chamber 12 open at one side and having the ends provided with open-ended vertical U-shaped slots, said slots being in alinement with each other. Rotatably seated in the chamber 12 is the cylindrical end 14 of a shaft 15, said end 14 having a pivot pin with ends projecting beyond the end 14, each of said ends being located in a slot 17 located in each side of the chamber 6 and open at its forward end.

It will be seen from the foregoing construction that a pull on the shaft 15 will oscillate the rotatable member 9, and if the pull is continued it will result in the release of the projecting ends of the pivot pin 16 from the grooves 17 thereby permitting the release of the shaft. When the shaft is mounted in place in the block 2 as shown it is held from being detached by suitable means for locking the member 9 against rotation. As here shown the trigger or latch 18 is employed which is pivoted to the rear end of the block 2 on its underside and has a tongue 19 adapted to project over the lip 11 of the member 9 to hold it in locked position, as shown in Figs. 2 and 5. The rear end 20 of the trigger or latch 18 is operated in any suitable manner to swing the tongue 19 out of engagement with the lip 11 of the member 9, and as here shown is operated by a wire or cord 21 which extends over a pulley 22 on the axle 1 and is connected to any suitable operating means within reach of the driver, said means enabling both wires and their latches to be simultaneously operated. In order to hold the latch or trigger 18 in locked position in engagement with the lip 11 and to cause the trigger to automatically swing back to its normal position the trigger 18 is provided with a coil spring 18′ located at its pivotal point, as shown in Fig. 3, serving to swing the latch or trigger to its normal position.

The shafts of a vehicle being connected to the axle thereof and locked thereto, as shown in Figs. 3 and 5, should the horse drawing the vehicle attempt to run away the driver by a pull on the wires 21 will instantaneously swing the latches 18 out of engagement with the lips 11 on the members 9 and thereupon a continued pull on the shafts 15 will cause the members 9 to be tilted and permit the projecting ends of the pivot pin 16 on each shaft 15 to be released from the members 2.

Having thus described the invention, what I claim is:—

1. In an apparatus of the kind described, an axle, a shaft connecting member secured to said axle and formed with a chamber having an open front end, and a slot in each side of said chamber having an open front end, an oscillatable member located in said chamber and having a lip, a trigger normally engaging said lip to lock said oscillatable member, means adapted to be connected with the driver's seat for operating said trigger, and a shaft having its rear end seated in said oscillatable member, and having pivot pin projections engaging said member and said slots in the sides of the shaft connecting member and detachable therefrom.

2. In an apparatus of the kind described, an axle, a shaft connecting member secured thereto, and having a chamber open at its top and forward end and provided with an opening in its bottom, a longitudinal slot in each side of said chamber, an oscillatable member mounted in said chamber and having a lip projecting from its bottom, and an open ended slot in each end of said oscillatable member, a shaft having its rear end projecting into said chamber, and rotatably seated in said oscillatable member, and having pivot pin projections located in the slots of said oscillatable member and in the open ended grooves in the sides of said chamber, a trigger normally engaging the lip of said oscillatable member, and means for operating said trigger adapted to be connected with the driver's seat.

In testimony whereof I hereunto affix my signature in presence of two witnesses.

JULIUS GEORGE FRANCIS.

Witnesses:
E. VUILLEMOT,
EMILE PERRET.

---

Copies of this patent may be obtained for five cents each, by addressing the "Commissioner of Patents, Washington, D. C."